United States Patent [19]

Crouzet

[11] 4,204,988

[45] May 27, 1980

[54] METHOD OF FORMING A PRODUCT FOR USE AS A CONCRETE SUBSTITUTE

[76] Inventor: Pierre A. Crouzet, 20 Romney Way, Parkwood, Western Australia, Australia

[21] Appl. No.: 914,700

[22] Filed: Jun. 12, 1978

Related U.S. Application Data

[60] Division of Ser. No. 773,097, Feb. 28, 1977, Pat. No. 4,115,336, which is a continuation-in-part of Ser. No. 711,182, Aug. 3, 1976, abandoned.

[30] Foreign Application Priority Data

Aug. 7, 1975 [AU] Australia ............................... PC2687
Apr. 27, 1976 [AU] Australia ............................ 13401/76

[51] Int. Cl.² .......................... C04B 7/35; C08J 3/06; C08J 9/28; C08L 67/06
[52] U.S. Cl. ...................... 260/29.6 S; 260/29.2 UA; 260/29.6 NR; 260/29.6 WQ; 521/63; 521/138; 525/469
[58] Field of Search .................. 260/296 S, 29.2 UA, 260/29.6 NR, 29.6 WQ; 521/63, 138

[56] References Cited

U.S. PATENT DOCUMENTS

| | | | |
|---|---|---|---|
| 3,240,736 | 3/1966 | Beckwith | 260/29.6 S |
| 3,256,219 | 6/1966 | Will | 260/29.2 UA |
| 3,437,619 | 4/1969 | Nutt | 260/29.2 UA |
| 3,539,441 | 11/1970 | Rabenold | 260/29.6 S |
| 3,544,344 | 12/1970 | Pratt et al. | 260/29.6 S |
| 3,733,285 | 5/1973 | Steffy | 260/29.6 S |
| 3,854,267 | 12/1974 | Weiant et al. | 260/29.6 S |
| 3,915,919 | 10/1975 | Nishioka et al. | 260/29.6 S |
| 3,947,398 | 3/1976 | Williams | 260/29.6 S |
| 3,955,992 | 5/1976 | Roberts | 260/29.6 S |
| 3,978,018 | 8/1976 | Self | 260/29.2 UA |
| 4,115,336 | 9/1978 | Crouzet | 521/138 |

*Primary Examiner*—Allan Lieberman
*Attorney, Agent, or Firm*—Sughrue, Rothwell, Mion, Zinn and Macpeak

[57] ABSTRACT

An emulsion formed by mixing water with a mixture consisting essentially of an unsaturated polyester resin and an unsaturated monomer, wherein said emulsion is so stable that demulsification does not occur when a setting agent of a kind which sets by hydration thereof is added thereto.

28 Claims, No Drawings

METHOD OF FORMING A PRODUCT FOR USE AS A CONCRETE SUBSTITUTE

BACKGROUND OF THE INVENTION

The present invention is a Division of application Ser. No. 773,097, filed Feb. 28, 1977, now U.S. Pat. No. 4,115,336, issued Sept. 19, 1978, which in turn is a continuation-in-part of application Ser. No. 711,182, filed Aug. 3, 1976 and now abandoned.

The present invention relates to emulsions formed by mixing water with a mixture of an unsaturated polyester and an unsaturated monomer and the use of such emulsions in the manufacture of hardenable mixtures containing a setting agent which sets by hydration thereof, for example, plaster of Paris and Portland cement.

Concrete derived from Portland cement has been used for many years in the construction industry. Its use in this industry derives from its high compressive strength. However it has very low tensile and flexural strength and is also subject to acidic attack. Further, because of the interstices in concrete, it is also liable to disintegration when subjected to freeze/thaw conditions.

In an effort to improve its properties, thereby extending its uses, various resins have been incorporated into the concrete by a variety of means. Thus, for example, emulsions of thermoplastic polymers have been blended into the concrete during mixing, or, if the concrete has a structure of sufficient porosity when set, the thermoplastic polymer has been impregnated into the set concrete. These compositions have improved the properties of concrete at normal ambient temperatures. However, when subjected to extreme temperatures, as in a fire, they melt and consequently lose their strength. Therefore, such materials have not found widespread use in the construction industry.

Improved properties would accrue to a concrete composition which incorporated a thermosetting resin rather than a thermoplastic resin since a thermosetting resin does not melt. Various attempts have been made to incorporate thermosetting resins, or more accurately, cross-linked resins, into concrete compositions. Thus Australian Pat. No. 426,171 refers to a dry cementitious composition containing a hydraulic cement, a polyvalent metal salt of a water redispersible addition polymer containing units derived from an $\alpha/\beta$ monoethylenically unsaturated carboxylic acid monomer, a sequestrant and a trimethylol alkane. Addition of water to the dry mix results in hydration of the addition polymer and sequestration of the polyvalent metal ions thereby allowing a condensation reaction to occur between the addition polymer and the trimethylol alkane simultaneously with the hydration of the cement.

U.S. Pat. No. 3,437,619 provides a dry mix comprising an unsaturated polyester resin, monomeric styrene, Portland cement, a base activated resin-dispersible initiator and an effective amount of an inhibitor. On the addition of water the hydroxyl ions provided by the cement activate the catalyst which then initiates an addition polymerization reaction between the unsaturated polyester and the styrene. Although prima facie polyester resin dry mixes have an advantage over emulsions since they reduce transport costs, this advantage is frequently outweighed by the cost of drying components, as in the case of the composition described in Australian Pat. No. 426,171, and the problem of avoiding setting during transit and storage which results in premature setting and consequent wastage. The use of inhibitors as in U.S. Pat. No. 3,437,619 to prevent early setting is also a disadvantage as they can prevent, and frequently retard, the addition polymerization from occurring in all but ideal circumstances. Thus advantages would accrue to a system which comprises cement, filler and an emulsion formed by mixing water with a cross-linkable monomer and cross-linking agent, wherein the water for hardening the cement is provided by the emulsion. Such a system is provided in U.S. Pat. No. 3,310,511 which describes an epoxy resin emulsion which can be incorporated into a concrete mix and hardened by an amine by means of a condensation polymerization reaction. However, epoxy resins are very expensive, thus an economic advantage is provided by using a cheaper cross-linkable system. Unsaturated polyester resins cross-linkable with an unsaturated monomer have been used for quite some time in the manufacture of fibre-glass reinforced polyester resins.

However, copolymerizable mixtures of an unsaturated polyester and an unsaturated monomer are not normally used as aqueous emulsions. Nevertheless, U.S. Pat. No. 3,256,219 describes water in resin emulsions in which the aqueous phase remains dispersed even during and after the addition polymerization of the unsaturated polyester with the unsaturated monomer. On the other hand there is no suggestion that the emulsions described in this Patent Specification remain stable after the addition of a setting agent which sets by hydration thereof.

Italian Pat. No. 585,721 describes polyester resins containing a hydraulic cement filler. Such filled polyester resins are manufactured by forming a dry mix of unsaturated polyester, unsaturated monomer, free radical initiator, promotor and nonionic emulsifier. Water is finally mixed into the dry mix. The water hydrates the cement. The heat of hydration accelerates the addition polymerization reaction between the unsaturated monomer and the unsaturated polyester initiated by the initiator and the emulsifier tends to aid the dispersion of water and thus cement throughout the mix. This invention suffers from the disadvantage that the mix has to be made in situ and further there is no appreciation of the fact that in order to obtain optimum properties for the mix when set it is essential to form an emulsion of water, unsaturated polyester and unsaturated monomer which remains stable after cement has been added.

SUMMARY OF THE INVENTION

Accordingly the present invention provides an emulsion formed by mixing water with a mixture consisting essentially of an unsaturated polyester resin and an unsaturated monomer, wherein said emulsion is so stable that demulsification does not occur when a setting agent of a kind which sets by hydration thereof is added thereto.

The invention also provides a method of forming a product which method comprises mixing the emulsion with a setting agent of a kind which sets by hydration thereof to form a hardenable mixture, causing an addition polymerization reaction to occur between said unsaturated polyester and said unsaturated monomer, allowing the hardenable mixture to harden thereby forming a product wherein sufficient water is provided by said emulsion to allow said hydration to occur.

DETAILED DESCRIPTION OF THE INVENTION

It should be understood that the term demulsification as used herein is used in the normal sense, i.e. the breaking of an emulsion to form two separate liquid layers, an aqueous layer and an organic layer. Thus, although the setting agent takes up water from the emulsion and, providing sufficient setting agent is present, the emulsion will eventually cease to exist, the emulsion at no stage breaks down into two separate liquid layers after the setting agent has been added thereto.

Preferably the emulsion contains from 35% to 65% by weight of water and is a water in resin emulsion. The setting agent may be an hydraulic cement, plaster of Paris, or a mixture of lime and hydraulic cement. Preferably the setting agent is a Portland cement.

The stability of the emulsion in the presence of the setting agent is influenced by the proportions of unsaturated monomer in the mixture, the ratio of reactants used in manufacturing the unsaturated polyester and the molecular weight of the reactants so used.

It has been discovered that emulsions based on unsaturated polyester/monomer mixtures comprising more than 30% by weight of unsaturated monomer based on the weight of the mixture, are unstable. Preferably therefore the mixture of unsaturated polyester and unsaturated monomer comprises no more than 30% by weight of the unsaturated monomer based on the weight of the mixture.

Preferably the molar ratio of unsaturated to saturated components lies in the range from 0.8 to 1.75, and more preferably in the range from 1.35 to 1.4.

Preferably the polyhydric alcohols and the polycarboxylic acids used in manufacturing the emulsions of the present invention are of high M.W., i.e. in the range from 100 to 1000, and more preferably are not polymers in their own right such as polyether polyols or polyester polyols. Suitable polyols are ethylene glycol, trimethylpentane diol and neopentyl glycol. However, a polyethylene glycol may also be used.

The total of said alcohol components is preferably in excess of 2 to 5 mole percent over stoichiometric requirements. The preferred molecular weight of the unsaturated polyester lies in the range from 3,100 to 3,600.

In forming the said polyester the condensation polymerization reaction preferably proceeds until the polyester has an acid number of 25 or less.

Preferably the unsaturated polyester or the unsaturated monomer contain substituent atoms of bromine or chlorine in order to improve the flame resistant properties of articles produced by the method of the present invention. Thus tetrabromophthalic anhydride is preferably used as one of the reactants employed in manufacturing the unsaturated polyesters to be incorporated into the emulsions of the present invention.

The unsaturated monomer may be a vinyl monomer, e.g. styrene, methyl methacrylate, diallyl phthalate monomer, triallyl cyanurate monomer, or mixtures thereof.

Preferably the addition polymerization reaction is initiated by a free radical initiator. The addition polymerization reaction may be caused by a hot or cold polymerization process. It is possible to manufacture a resin with two initiator additives, one which allows partial polymerization at ambient temperature and a second catalyst additive which will achieve the complete and final polymerization in a hot press system. This double additive process makes it possible to deliver a mortar in pregelled rolls. A suitable initiator for initiation at low temperatures is dibenzoyl peroxide promoted by a copper compound. However the preferred initiators are methyl ethyl ketone peroxide and butyl perbenzoate. Other suitable initiators are the organic hydroperoxides, and hydrogen peroxide. It is also possible to employ free radical initiators which are activated by ultra violet light. Alternatively the addition polymerization process may be initiated by high energy irradiation.

When the setting agent and initiator are added to the emulsion and mixed therewith, the setting agent penetrates the emulsion and is hydrated by the water. If the initiator employed is of the heat activated type, the heat generated by hydration of the cement activates the initiator after 10–15 minutes. The activated initiator then initiates an addition polymerization reaction between the unsaturated polyester and the unsaturated monomer. The heat of hydration promotes the rate of addition polymerization, resulting in rapid setting of the mixture of emulsion and setting agent. Initial set usually occurs within 30 minutes. However if a low temperature initiator is added to a mixture of the emulsion and aggregate, the mixture does not begin to set for several hours. Thus in practice the setting agent is preferably added to the emulsion at the site of use. On the other hand if the site is not very distant from the mixing plant, the initiator may be added at the mixing plant, and the setting agent mixed in on site.

Of course any suitable form of reinforcement may be incorporated into the final product prior to setting thereof, such as fibre-glass or steel. Short fibre-glass lengths introduced into the material during manufacture have been found to be quite satisfactory. The formation of the emulsion of unsaturated polyester and unsaturated monomer is important to the production of satisfactory materials. The emulsion may be prepared by mixing the unsaturated polyester, the unsaturated monomer and water in a high speed mixer which is able to render the dispersed phase into a particulate form with a particle size equal to, or somewhat less than, 25 microns. Preferably the unsaturated polyester resin is such that it can be emulsified with up to 60% by weight of water without demulsification occurring on the addition of the setting agent. In order to form such stable emulsions it is possible to employ small quantities of emulsifying agent, e.g. a non-ionic or anionic emulsifier but it is not necessary. In order to ensure stability of the emulsion for transportation and storage it may also be necessary to add stabilizers such as Titanium dioxide (rutile), an emulsion of a vinylic or acrylic addition polymer (1% by weight of the unsaturated polyester plus unsaturated monomer). This filler may be calcium carbonate or calcium silicate.

The invention is further described with reference to the following Examples:

EXAMPLE 1

An unsaturated polyester with one acid of high molecular weight was formed from the following components:

269 parts by weight Ethylene Glycol
382 parts by weight Tetrabromophthalic anhydride (MW=463.7)
224 parts by weight Maleic anhydride or fumaric acid
149 parts by weight Phthalic anhydride.

A mixture of the above components was formed and heated in a reaction vessel with continuous agitation, with a current of inert gas being swept through and over the charge. Heating was carried out as follows:
 (a) initially at 170° C. for one hour,
 (b) then at 185° C. for 30 minutes, and
 (c) then at 190° C. for 7 hours.
The reaction of the components was terminated when an acid index under 20 was obtained and the resultant polymer was then cooled.

EXAMPLE 2

The steps of Example 1 were followed except that the components to form the polyester comprised the following:
 467 parts by weight Trimethylpentanediol (MW=146.15)
 15 parts by weight Pentaerythritol
 98 parts by weight Maleic anhydride,
the components thus including one glycol of high molecular weight.

EXAMPLE 3

The steps of Example 1 were followed using, however, components as follows:
 394 parts by weight of Trimethylpentanediol (MW=146.15)
 430 parts by weight Tetrabromophthalic anhydride MW=463.7)
 41 parts by weight Pentaerythritol
 186 parts Maleic anhydride or fumaric acid.
the components thus including one glycol and one acid of high molecular weight.

EXAMPLE 4

The steps of Example 1 were followed using, however, components as follows:
 250 parts by weight Ethylene Glycol
 382 parts by weight Tetrabromophthalic anhydride
 224 parts by weight Maleic anhydride or fumaric acid
 149 parts by weight Phthalic anhydride
 19 parts by weight 2,2-bis(methylallylether)-1-butanol
The substituted butanol was added at the end of the esterification reaction.

EXAMPLE 5

The steps of Example 1 were followed using, however, components as follows:
 467 parts by weight Trimethylpentanediol
 15 parts by weight Pentaerythritol
 98 parts by weight Maleic anhydride
 10 parts by weight 2,2-bis(methylallylether)-1-butanol
Again the substituted butanol was added at the end of the esterification reaction.

EXAMPLE 6

The steps of Example 1 were followed using, however, components as follows:
 394 parts by weight Trimethylpentanediol
 430 parts by weight Tetrabromophthalic anhydride
 41 parts by weight Pentaerythritol
 186 parts by weight Maleic anhydride or fumaric acid
 8 parts by weight 2,2-bis(methylallylether)-1-butanol
Again the substituted butanol was added at the end of the esterification reaction.

EXAMPLE 7

The polyesters of Examples 1–6 were each blended with 290 parts by weight, 200 parts by weight, 280 parts by weight, 290 parts by weight, 200 parts by weight and 280 parts by weight respectively of monomer in the form of styrene to form a mixture of unsaturated polyester and unsaturated monomer.

EXAMPLE 8

The polyesters of Examples 1–6 were each blended with 290 parts by weight, 200 parts by weight, 280 parts by weight, 290 parts by weight, 200 parts by weight and 280 parts by weight respectively of monomer in the form of methyl methacrylate to form a mixture of unsaturated polyester and unsaturated monomer.

EXAMPLE 9

The polyesters of Examples 1–6 were each blended with 290 parts by weight, 200 parts by weight, 280 parts by weight, 290 parts by weight, 200 parts by weight and 280 parts by weight respectively of monomer in the form of a 50/50 mixture by weight of styrene and methyl methacrylate to form a mixture of an unsaturated polyester and unsaturated monomer.

EXAMPLE 10

The polyesters of Examples 1–6 were each blended with 710 parts by weight, 490 parts by weight, 690 parts by weight, 710 parts by weight, 490 parts by weight and 690 parts by weight respectively of diallylphthalate monomer to form a mixture of unsaturated polyester and unsaturated monomer which can be cross-linked at high temperature.

EXAMPLE 11

The polyesters of Examples 1–6 were each blended with 710 parts by weight, 490 parts by weight, 690 parts by weight, 710 parts by weight, 490 parts by weight and 690 parts by weight respectively of a 50/50 molar mixture of styrene and triallyl cyanurate monomer to form a mixture of unsaturated polyester and unsaturated monomer according to the invention.

EXAMPLE 12

The mixtures of Example 7 to 11 were formed into emulsions with water, by mixing components as follows:
 500 parts by weight mixture
 3 parts by weight promotor in the form of Cobalt Octoate
 300 parts by weight water.
The mixing was effected using a high speed mixer, the mixing speed being sufficient so that substantially all the dispersed phase was in particle form with a particle size equal to or less than 25 micron.

EXAMPLE 13

Cementitious products were formed by mixing in a standard cement mixer components in the proportions as follows:
 803 parts by weight of the emulsion of Example 12
 500 parts by weight of Portland cement
 5 parts by weight of Silica Flour
 3300 parts by weight of sand
 2700 parts by weight of gravel
 5 parts by weight of Catalyst in the form of Methyl Ethyl Ketone Peroxide.

The mixtures were poured into a mould between two sheets of fibreglass mat and pressed at 2.5 kg/cm² until hardening occurred. The results were panels with very high mechanical characteristics with good anti-corrosion properties.

EXAMPLE 14

The mixtures of Examples 8 and 9 were formed into emulsions with water, by mixing components as follows:

500 parts by weight of resin
300 parts by weight of water

The mixing was effected using a high speed mixer, the mixing speed being sufficient so that substantially all the resin was in particle form with a particle size equal to or less than 25 micron.

EXAMPLE 15

Cementitious products were formed by mixing in a standard cement mixer components as follows:

800 parts by weight of the emulsion of Example 14
500 parts by weight of Portland cement
10 parts by weight of Catalyst (Tertbutyl perbenzoate)
3300 parts by weight of sand
2700 parts by weight of gravel The mixtures were poured into moulds between two sheets of fibreglass mat pressed at 4.5 kg/cm² and heated for 5 minutes at 99° C. and demoulded. The results were panels with very high mechanical properties, good chemical resistance and improved imperviousness. A torch welder flame applied on the surface of a so-produced panel for 30 minutes affected the surface only with a blackening effect, but there was no ignition.

EXAMPLE 16

The mixtures of Examples 7 to 9 were formed into emulsions with water, by mixing components as follows:

500 parts by weight mixture
3 parts by weight promotor in the form of Cobalt Octoate
500 parts by weight water The mixing was effected using a high speed mixer, the mixing speed being sufficient so that substantially all the dispersed phase was in particle form with a particle size equal to or less than 25 micron.

EXAMPLE 17

Plaster materials were prepared by mixing in a standard cement mixer components as follows:

1003 parts by weight of the emulsion of Example 16
500 parts by weight of plaster of Paris
5 parts by weight of Silica Flour
3300 parts by weight of sand
2700 parts by weight of gravel
5 parts by weight of Catalyst in the form of
Methyl Ethyl Ketone Peroxide The resulting mixtures were poured into moulds between two sheets of fibreglass mat and pressed at 3 kg/cm².

The panels obtained showed mechanical properties similar in strength to panels made with cement, but many times stronger than a standard plaster panel.

EXAMPLE 18

The mixtures of Examples 7 to 9 were formed into emulsions with water, by mixing components as follows:

500 parts by weight mixture
500 parts by weight water

The mixing was effected using a high speed mixer, the mixing speed being sufficient so that substantially all the dispersed phase was in particle form with a particle size equal to or less than 25 micron.

EXAMPLE 19

Plaster materials were prepared by mixing in a standard cement mixer components as follows:

1000 parts by weight of the emulsion of Example 18
500 parts by weight of plaster of Paris
10 parts by weight of Catalyst (Tertbutyl perbenzoate)
3300 parts by weight of sand
2700 parts by weight of gravel The resulting mixtures were poured into moulds between two sheets of fibreglass mat and pressed at 3 kg/cm².

The panels obtained showed mechanical properties similar in strength to panels made with cement, but many times stronger than a standard plaster panel.

EXAMPLE 20

Cementitious products were formed by mixing in a standard cement mixer components as follows:

800 parts by weight of the emulsion of Example 14
500 parts by weight of lime
5 parts by weight of Silica Flour
3300 parts by weight of sand
2700 parts by weight of gravel
5 parts by weight of Catalyst in the form of
Methyl Ethyl Ketone Peroxide.

The mixtures were poured into a mould between two sheets of fibreglass mat and pressed at 2.5 kg/cm² until hardening occurred. The results were panels with very high mechanical strength and good anticorrosive properties.

EXAMPLE 21

Cementitious products were formed by mixing in a standard cement mixer components as follows:

800 parts by weight of the emulsion of Example 14
500 parts by weight of a 50/50 mixture by weight of lime and Portland cement
5 parts by weight of Silica Flour
3300 parts by weight of sand
2700 parts by weight of gravel
5 parts by weight of Catalyst in the form of
Methyl Ethyl Ketone Peroxide.

The mixtures were poured into a mould between two sheets of fibreglass mat and pressed at 2.5 kg/cm² until hardening occurred. The results were panels with very high mechanical characteristics with good anticorrosive properties.

Products formed in accordance with the invention can easily be manufactured having strength characteristics far superior to standard concrete. For example, tests conducted on a product of Example 13 are compared in the following table with properties of standard concrete and with the properties of a resin sand mixture of known type.

|  | Concrete | Resin Sand | Product of this invention |
| --- | --- | --- | --- |
| Specific gravity | 2.4 | 2.1 | 1.9 |
| Compressive strength Kg/cm$^2$ | 300 | 1200 | 1780 |
| Flexural strength Kg/cm$^2$ | 70 | 1300 | 1300 |
| Tensile strength Kg/cm$^2$ | 30 | 430 | 500 |
| Impact strength Kg/cm/cm$^2$ | 0.4 | 10 | 8.2 |
| Exothermic maximum | 30/40° C. | 120° C. | 75/80° C. |

The products obtained using the three polyesters of Examples 1 to 3 are almost completely waterproof, which is of significance in materials used for forming building panels and like components. While the polyesters of Example 3 have been found to be insensitive to temperatures at least in the range from −60° C. to 135° C. and to repeated thermal shocks between the same range of temperatures. Also the product can be arranged to exhibit small shrinkage during setting, shrinkages of less than 1 mm/meter being readily obtainable.

I claim:

1. A method of forming a product which method comprises the steps of
(A) preparing a water in resin emulsion by mixing
   (i) water with
   (ii) a mixture consisting essentially of (a) an unsaturated polyester resin having a molecular weight from about 3100 to 3600 formed by a condensation polymerization reaction, which is allowed to proceed until the polyester has an acid number of no more than about 25, between polyhydric and polycarboxylic compounds or derivatives thereof, said polyhydric compounds being present in excess over stoichiometric requirements, at least one of said compounds being unsaturated, the remainder being saturated; and (b) an unsaturated monomer; the mixture (ii) containing no more than about 30% by weight of the unsaturated monomer (b); wherein said emulsion is so stable that demulsification does not occur when a setting agent of the kind hereinafter defined is added thereto;
(B) mixing the water in resin emulsion of step (A) with a setting agent of a kind which sets by hydration thereof to form a hardenable mixture;
(C) causing an addition polymerization reaction to occur between said unsaturated polyester resin and said unsaturated monomer; and
(D) allowing the hardenable mixture to harden thereby forming a product, wherein the quantity of emulsion mixed with the setting agent is such that sufficient water is provided by said emulsion to allow said hydration to occur.

2. The method according to claim 1 wherein the emulsion contains from 35% to 60% by weight of water based on the weight of the emulsion.

3. The method according to claim 1, wherein the polyhydric compounds are selected from the group consisting of ethylene glycol, trimethylpentanediol, polyethylene glycol and neopentyl glycol.

4. The method according to claim 1 wherein the unsaturated monomer is an acrylate or methacrylate monomer.

5. The method according to claim 1 wherein the mixture contains an addition polymerization promoter to promote a subsequent addition polymerization reaction between said unsaturated polyester and said unsaturated monomer.

6. The method according to claim 5, wherein said promoter is cobalt octoate.

7. A method of forming a product according to claim 1, wherein a siliceous filler is added to the hardenable mixture.

8. A method according to claim 1, wherein the setting agent is a hydraulic cement.

9. A method according to claim 1, wherein the setting agent is Portland cement.

10. A method according to claim 1, wherein the setting agent is plaster of Paris.

11. A method according to claim 1, wherein the setting agent is a mixture of lime and Portland cement.

12. A method according to claim 1, wherein the addition polymerization reaction is caused by an initiator.

13. A method according to claim 12, wherein the initiator is added to the emulsion just prior to said mixing with said setting agent.

14. A method according to claim 12, wherein the initiator is activated by heat to cause said addition polymerization at an elevated temperature.

15. A method according to claim 12, wherein the initiator is an organic hydroperoxide.

16. A method according to claim 12, wherein the initiator is dibenzoyl peroxide.

17. A method according to claim 15, wherein the initiator is methylethylketone peroxide.

18. A method according to claim 15, wherein the initiator is tertiaryl butyl perbenzoate.

19. A method according to claim 1, wherein the addition polymerization is caused by an initiator system containing two initiators, one of which initiates a partial addition polymerization reaction at ambient temperature the other of which is heat activated to complete said addition polymerization.

20. A method according to claim 7, wherein the siliceous filler is sand, gravel, aggregate, or a mixture thereof.

21. A method according to claim 1, wherein the molar ratio of unsaturated to saturated compounds lies in the range from 0.8 to 1.75.

22. A method according to claim 1, wherein the molar ratio of unsaturated to saturated compounds lies in the range from 1.35 to 1.4.

23. A method according to claim 1, wherein the polycarboxylic compounds are selected from the group consisting of tetrabromophthalic anhydride, maleic anhydride, fumaric acid and phthalic anhydride.

24. A method according to claim 1, wherein the polyhydric compounds are mixed with pentaerythritol prior to the condensation polymerization reaction with the polycarboxylic acid compound, and 2,2-bis(methylallylether)-1-butanol is added towards the end of the condensation polymerization reaction.

25. A method according to claim 1, wherein said polyhydric compounds are present in an excess of 2 to 5 mole percent over stoichiometric requirements.

26. A method according to claim 1, wherein at least one of said compounds has a high molecular weight.

27. A method according to claim 1, wherein the unsaturated monomer is a vinyl monomer.

28. A method according to claim 1, wherein the unsaturated monomer is selected from the group consisting of styrene, methyl methacrylate, diallyl phthalate, triallyl cyanurate and mixtures thereof.

* * * * *